(12) United States Patent
Kuusilinna et al.

(10) Patent No.: US 8,850,076 B2
(45) Date of Patent: Sep. 30, 2014

(54) MODULAR DEVICE COMPONENT

(75) Inventors: Kimmo Kalervo Kuusilinna, Berkeley, CA (US); Jari Antero Nikara, Lempäälä (FI); Petri Mikko Johannes Liuha, Tampere (FI)

(73) Assignee: Nokia Corporation, Espoo (FI)

( * ) Notice: Subject to any disclaimer, the term of this patent is extended or adjusted under 35 U.S.C. 154(b) by 438 days.

(21) Appl. No.: 12/593,674

(22) PCT Filed: Mar. 27, 2008

(86) PCT No.: PCT/EP2008/053630
§ 371 (c)(1),
(2), (4) Date: Apr. 28, 2010

(87) PCT Pub. No.: WO2008/119732
PCT Pub. Date: Oct. 9, 2008

(65) Prior Publication Data
US 2010/0205325 A1    Aug. 12, 2010

(30) Foreign Application Priority Data

Mar. 29, 2007 (GB) .................................. 0706134.4

(51) Int. Cl.
*G06F 15/16* (2006.01)
*H04L 12/803* (2013.01)
*H04L 29/06* (2006.01)
*H04L 12/911* (2013.01)
*H04L 29/08* (2006.01)

(52) U.S. Cl.
CPC .............. *H04L 69/12* (2013.01); *H04L 47/125* (2013.01); *H04L 67/1006* (2013.01); *H04L 47/726* (2013.01); *H04L 67/1002* (2013.01)

USPC ........... 709/250; 709/224; 370/352; 380/270; 713/153

(58) Field of Classification Search
CPC . H04L 47/125; H04L 47/726; H04L 67/1002; H04L 67/1006
USPC ........................................................ 709/250
See application file for complete search history.

(56) References Cited

U.S. PATENT DOCUMENTS

| 6,353,867 | B1 | 3/2002 | Qureshi et al. |
| 7,159,052 | B1 | 1/2007 | Rhee |
| 2001/0005884 | A1* | 6/2001 | Serada .......................... 713/153 |
| 2002/0016706 | A1 | 2/2002 | Cooke et al. |
| 2002/0087729 | A1* | 7/2002 | Edgar ........................... 709/246 |

(Continued)

FOREIGN PATENT DOCUMENTS

DE    102004035843 A1    2/2006

OTHER PUBLICATIONS

IP.com Search.*
Google Patent Search.*

(Continued)

*Primary Examiner* — Arvin Eskandarnia
(74) *Attorney, Agent, or Firm* — Harrington & Smith (57) ABSTRACT

A component of an electronic device comprises a network connection processor, which comprises a physical network connection block to receive data from and transmit data to a network and a first data processor configured to process data arriving at the network connection processor, and a second data processor configured to process data received from the network connection processor.

20 Claims, 7 Drawing Sheets

(56) References Cited

U.S. PATENT DOCUMENTS

| | | | |
|---|---|---|---|
| 2002/0143928 A1* | 10/2002 | Maltz et al. | 709/224 |
| 2002/0144045 A1 | 10/2002 | Edara et al. | |
| 2004/0042483 A1 | 3/2004 | Elzur et al. | |
| 2004/0176059 A1* | 9/2004 | Hayem et al. | 455/168.1 |
| 2004/0257986 A1 | 12/2004 | Jha et al. | |
| 2005/0021871 A1 | 1/2005 | Georgiou et al. | |
| 2005/0257031 A1 | 11/2005 | Kundu et al. | |
| 2005/0265315 A1* | 12/2005 | Edgar | 370/352 |
| 2007/0030856 A1* | 2/2007 | Cooke et al. | 370/401 |

OTHER PUBLICATIONS

International Search Report and Written Opinion of the International Searching Authority for PCT Application No. PCT/EP2008/053630, dated Aug. 27, 2008, 16 pages.

Search Report received from Great Britain Patent Application No. 0706134.4, dated Jul. 27, 2007, 3 pages.

Suroanta et al., "New Directions in mobile device architectures", Digital System Design: Architectures Methods and Tools, 2006. DSD 2006 9th Euromicro Conference on, IEEE, PI , Jan. 1, 2006.

* cited by examiner

MODULAR DEVICE COMPONENT

RELATED APPLICATION

This application was originally filed as PCT Application No. PCT/EP2008/053630 on Mar. 27, 2008 and claims priority to GB Application No. 0706134.4 filed on Mar. 29, 2007, which is incorporated herein by reference in its entirety.

FIELD OF THE INVENTION

The presented invention relates to a component of an electrical device and more particularly to the construction of the component and the way in which it connects to a network.

BACKGROUND OF THE INVENTION

In many companies with complex high technology products, the renewal of product architectures can be a very arduous process. It is common that a successful technical asset in the beginning turns out to be a significant barrier to renewing the company. This results in legacy gradually taking control over the decisions and real changes not being made until the situation becomes critical.

Therefore, in recent times, such companies have been investigating solutions to this problem. One such solution is the use of modular architectures, wherein a device consists of a number of components, each responsible for a different application or service, connected by a network interconnect. An example of such a modular architecture is that of Network on a Terminal Architecture (NoTA).

Figure 1:
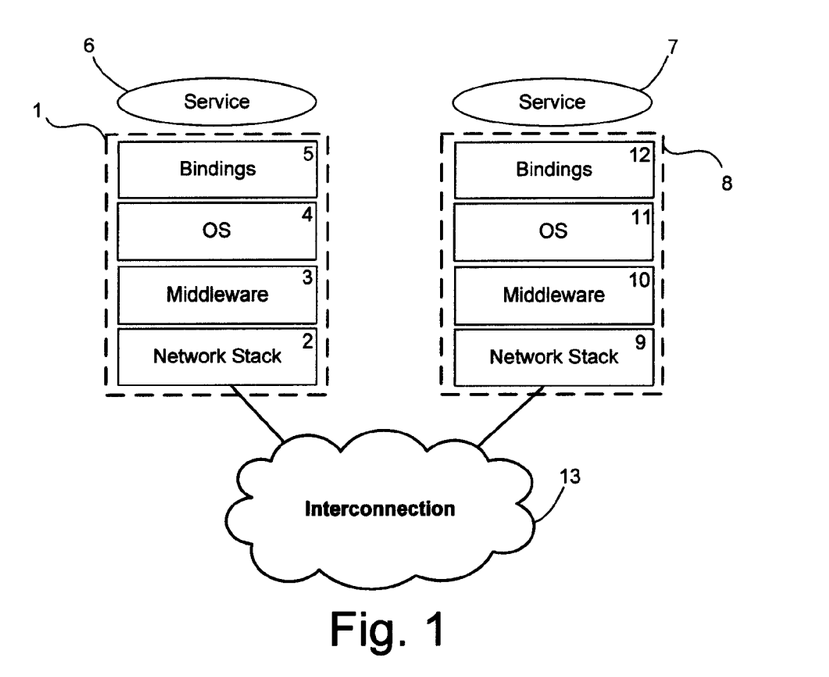
FIG. 1 shows two interconnected NoTA communications stacks.

In NoTA each component has mapped to it a service/services or application/applications and a communication stack, with each communications stack connected to the network interconnect. FIG. 1 shows two interconnected NoTA communications stacks that logically enable two services to communicate. The first communication stack 1 comprises a first network stack 2, first middleware 3, a first operating system 4 and first bindings 5, and enables the first service 6 to communicate with a second service 7. Likewise, the second communication stack 8 comprises a second network stack 9, second middleware 10, a second operating system 11 and second bindings 12, and enables the second service 7 to communicate with the first service 6. The two communication stacks are connected through a network 13.

In this case the term network stack may relate to the first four layers of the Open Systems Interconnection Basic Reference Model (OSI Model). The first four layers of the OSI model are often known as the physical layer, the data link layer, the network layer and the transport layer. These four layers deal with the transport of data between applications and services and the network.

Middleware generally relates to software layers that mediate interaction between applications or services so that they can exchange data. The provision of middleware in a system also simplifies application development, by providing functions, such as masking the heterogeneity and distribution of the underlying hardware and operating systems, and the hiding of low-level programming details.

A NoTA hardware organisation of an electronic device may comprise a number of components connected through a network, each implementing a different application or service.

Each component may contain a microprocessor to which an application or service, and a NoTA communications stack (as in FIG. 1) may be mapped. Each component may further comprise a physical network connection block to receive data from the network switch and a memory to store data. The microprocessor, the physical network connection block and the memory may all be connected to a BUS or another kind of communication network.

One main problem that exists with conventional modular architectures is that the components contain many implementation layers (such as those in FIG. 1) with complex functionality. Therefore, the automatic implementation of these layers tends to result in a large code footprint, slow execution due to the component processor having to process the network traffic loads, and low power efficiency. Hence, such modular architectures tend not to be very competitive when compared to dedicated communication implementations with fewer channels.

Furthermore, generally, contemporary modular components are not truly independent, but instead tend to have interdependencies with other components in the system. This prevents, for example, optimal power management, due to more than one component being required to perform one task that might ideally be performed by a single component.

Another issue with contemporary modular components is that often the component processor is also responsible for moving incoming data to the memory. This means that the processor is unavailable for performing other more important tasks during this time.

Besides the renewal of architectures, another important issue that affects companies with complex high technology products is how to enable vendors to bring their intellectual property (IP) to a particular architecture. Traditionally, this has been difficult due to the confidentiality of future device architectures. Moreover, if a vendor develops IP for an existing architecture they may be too late, because new designs are likely to utilise new architectures.

SUMMARY OF THE INVENTION

The present invention provides a component of an electronic device comprising a network connection processor, which comprises a physical network connection block to receive data from and transmit data to a network and a first data processor configured to process data arriving at the network connection processor, and a second data processor configured to process data received from the network connection processor.

The first data processor may be configured to process the data by implementing middleware and network stack functionalities. This improves the efficiency of the second data processor because the network interconnect traffic is dealt with by the network connection processor and therefore enables the second data processor to perform other tasks. Furthermore, the second data processor need not be overdimensioned for network traffic.

The network connection processor may be decouplable from the component. This enables legacy systems to be adapted to the new architecture simply by incorporating the network connection processor. Similarly, this also enables forward integration whereby as long as the component includes a network connection processor, it can be connected to the network.

The second data processor may be configured to implement an application or service.

The component may further comprise a transport system configured to transport data between the network connection processor and the secondary data processor.

The component may have internal memory. This enables incoming data to be stored prior to being processed by the second data processor.

The transport system may be further configured to transport data between the network connection processor and the memory, and between the second data processor and the memory.

The component may have external memory, the external memory being exclusive to the component so as to reduce interdependency between components.

The network connection processor may further comprise memory. The memory may comprise circular buffers. This improves the overall performance of the network connection processor by enabling received data to be stored prior to processing.

The second data processor may be a field programmable gate array. This enables the component to be programmable and therefore able to implement a number of different services or applications as desired.

The transport system may be a BUS.

The present invention also provides an electronic device of modular construction comprising a plurality of components as described above. This enables the device to perform a number of different services or applications, with each being mapped to a different component.

The plurality of components may be connected by the network, and the electronic device may be a mobile phone.

The first data processor may be configured to implement firewall functionalities.

The present invention further provides a method comprising receiving data from a network, processing the received data, transporting the processed data to a memory, storing the processed data, transporting the processed data from the memory to a second data processor and further processing the processed data.

Processing the received data may comprise implementing network stack and middleware functionalities.

Further processing the processed data may comprise implementing an application or service.

Processing the received data may comprise implementing firewall functionalities.

BRIEF DESCRIPTION OF THE DRAWINGS

Embodiments of the present invention will now be described, by way of example only, with reference to the accompanying drawings in which.

DETAILED DESCRIPTION

Figure 2:
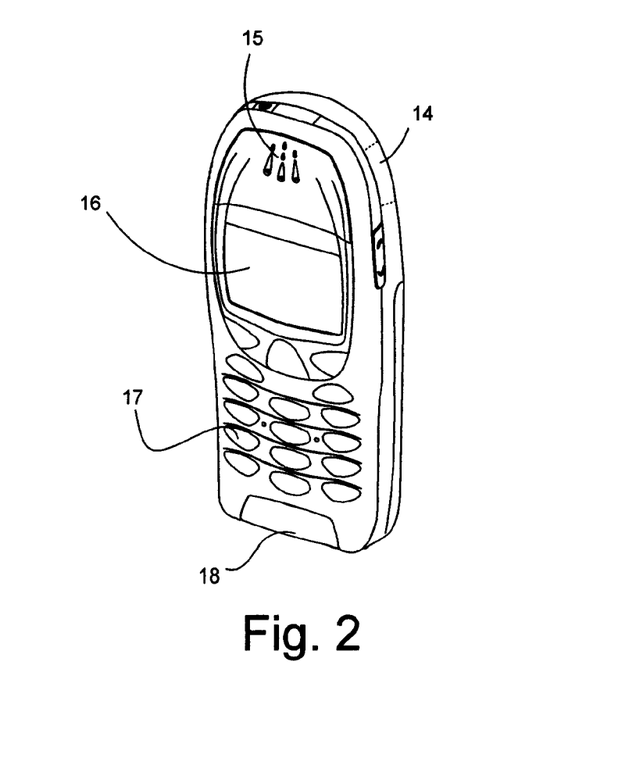
FIG. 2 shows a mobile telephone terminal.

FIG. 2 shows a mobile phone terminal. Visible are an aerial 14, a speaker 15, a display 16, a keypad 17 and an audio receiver 18.

Figure 3:
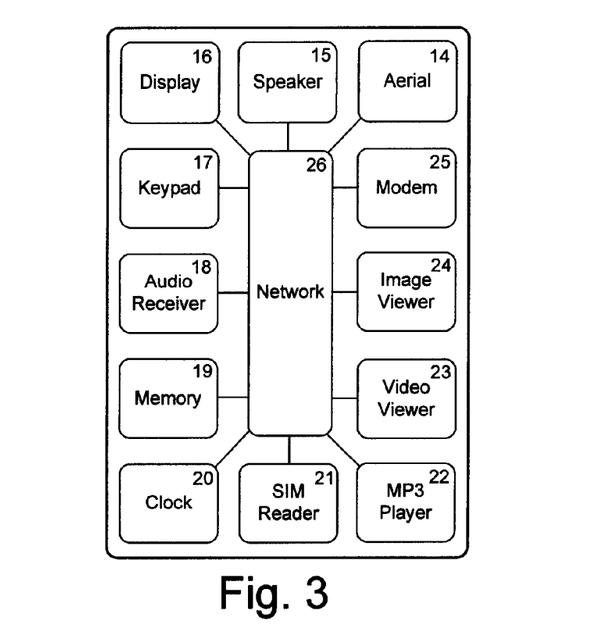
FIG. 3 shows an exemplary modular network hardware organisation of the mobile telephone phone terminal of FIG. 2.

FIG. 3 shows an exemplary modular network hardware organisation of the mobile telephone depicted in FIG. 2. The mobile phone comprises a plurality of components each relating to a different function of the mobile phone. The components comprise the aerial 14, the speaker 15, the display 16, the keypad 17, the audio receiver 18, a memory 19, a clock 20, a SIM card reader 21, an MP3 player 22, a video player 23, an image viewer 24, a modem 25. Each component is connected to a network switch 26.

Data may be passed from one component to another, via the network switch 26. For example, data received by the aerial 14 may be passed via the network switch 26 to the speaker 15 and likewise data received from the audio receiver 18 may be passed via the network switch 26 to the aerial 14.

Figure 4:
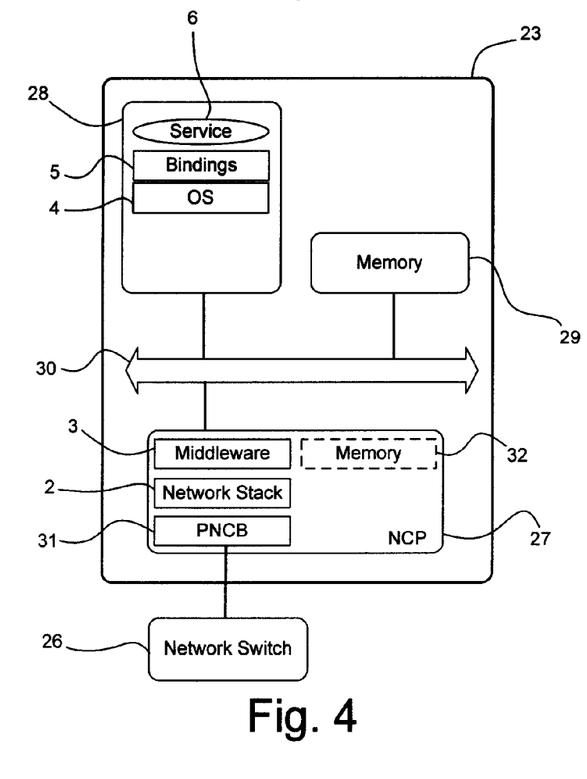
FIG. 4 shows a component of the modular network hardware organisation of FIG. 3.

FIG. 4 shows an example of a component of the modular network hardware organisation of FIG. 3. The component may be, for example, the video viewer 23. The component 23 comprises a network connection processor (NCP) 27, a component processor 28, a memory 29 and an internal connection such as a BUS 30. The network connection processor (NCP) 27 is a hardware processor.

The network connection processor 27 has an integrated physical network connection block (PNCB) 31, which is connected to the network switch 26 of the hardware organisation. The physical network connection block 31 may receive incoming data from the network switch 26, and conversely the network switch 26 may receive outgoing data from physical network connection block 31.

Mapped to the network connection processor 27 are network stack 2 and middleware 3 functionalities. These functionalities are responsible for the decoding of the incoming data and the determination of the destination of the incoming data, such as whether the data be passed to the memory 29 for retrieval at a later time, or whether it be passed to the memory 29 and on to the component processor 28 for immediate processing. Furthermore they are also responsible for, among other things, the transformation of the incoming data into a format that is recognized by the component processor 28. The network connection processor 27 may also be implemented so as to enforce memory locality, whereby it denies access to the component memory by a second component. This reduces the interdependency between components.

The presence of the network connection processor 27 means that the component processor 28 need not perform the above functions and thus the component processor 28 is free to perform other tasks.

It may be advisable, for performance reasons, for the network connection processor 27 to have internal memory 32. It may be used as buffers for DMA-like situations, temporal storage for protocol processing, temporal and configuration storage for the middleware 3, and as an instruction and/or data cache for the network connection processor 27. However, the network connection processor 27 may still operate successfully without an internal memory. Instead, the network connection processor 27 could utilise the component memory 29.

The component processor 28 may be a microchip, which has mapped to it the service or application 6, the bindings 5, and operating system (OS) software 4. The component processor receives data of a recognized format from the network connection processor 27 and implements the service or the application 6.

The processing power of the network connection processor 27 may be relatively low in comparison to that of the component processor 27 due to the limited functionality it is required to implement.

It should be noted that although the component memory 29 has been depicted as embedded memory, this is only a logical restriction. The memory 29 may be physically outside of the component 23, but it is important that the memory is logically not accessible by anyone else other than the component 23 itself.

The provision of a network connection processor 27 in a component of modular-network hardware architecture is desirable due to the programmer-friendly interface provided towards the component processor, flexibility in DMA and other memory management schemes, and the possibility for software or firmware updates. The efficiency of the network connection processor 27 can be further enhanced with the use of application (or service) specific instructions, thus making the network connection processor 27 an Application Specific Instruction-set Processor (ASIP).

Furthermore, a network connection processor facilitates the implementation of highly modular systems. This may result in increased power efficiency, because where a particular function might have required two or more components to be operational in a previous, less modular system, a highly modular system may be able carry out the function with just one dedicated component.

The provision of a network connection processor 27 also enables unknown vendors to implement their IP, i.e. their software and its underlying functionality, with a particular architecture. In conventional systems, in order to incorporate IP into a particular architecture, it is necessary for the vendor to know and understand the architecture so that they can integrate their IP with that architecture. This is sometimes a problem as a producer of the architecture may be reluctant to commit to purchase and thus disclose the details of the architecture without having sufficiently tested the vendor's product. The above-described embodiments allow that, instead of revealing the details of the architecture to an unknown vendor, the producer of the architecture is able to give the vendor a network connection processor 27, which the vendor can integrate with their IP to form a new component. The producer can then simply plug in the new component to existing prototyping environments in order to test it.

Figure 5:
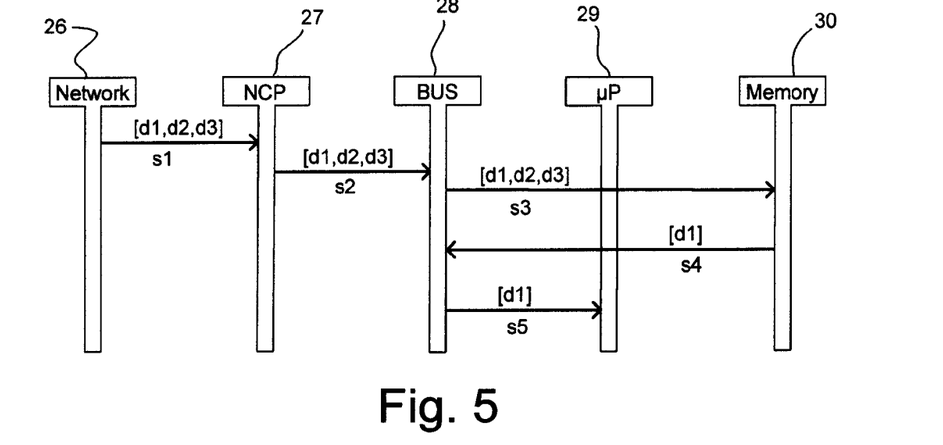
FIG. 5 shows the flow of data within the component of FIG. 4.

The provision of a network connection processor 27 in a component also provides significant improvements in performance when compared to conventional component implementation. FIG. 5 shows the flow of data into and within a component, such as that in FIG. 4. In this example, a data packet, comprising three individual data pieces, is incoming from the network and the component processor requires the first data piece for immediate processing. First, the data packet (d1, d2, d3) is received s1 from the network stack 26 by the network connection processor 27, where the destinations of the individual data pieces are determined. The network connection processor 27 then sends the whole data packet to the BUS 30 s2. The data packet is then transferred from the BUS 30 to the memory 29 s3. At this point, the required first data piece (d1) is passed from the memory 29 to the BUS 30 s4, and from the BUS 30 to the component processor 28 s5 for processing.

Figure 6:
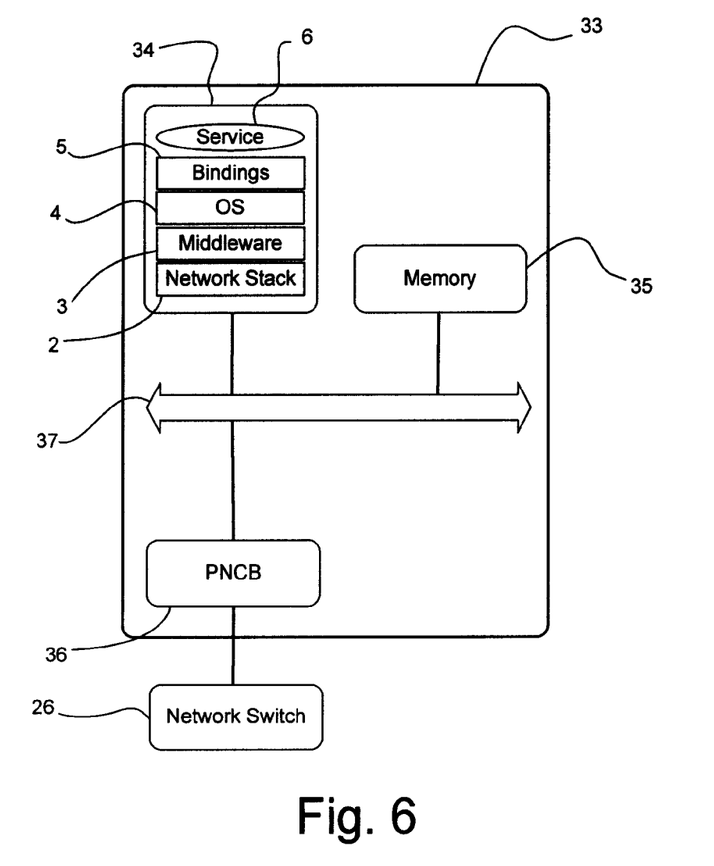
FIG. 6 shows a conventional component of modular network hardware organisation.

FIG. 6 shows a conventional component of a modular network architecture, without a network connection processor. The component 33 comprises a component processor 34, a memory 35, a physical network connection block 36 and a BUS 37. The physical network connection block 36 is connected to the network switch 26. Mapped to the component processor are the service 6, bindings 5, an operating system 4, middleware 3 and the network stack 2.

Figure 7:
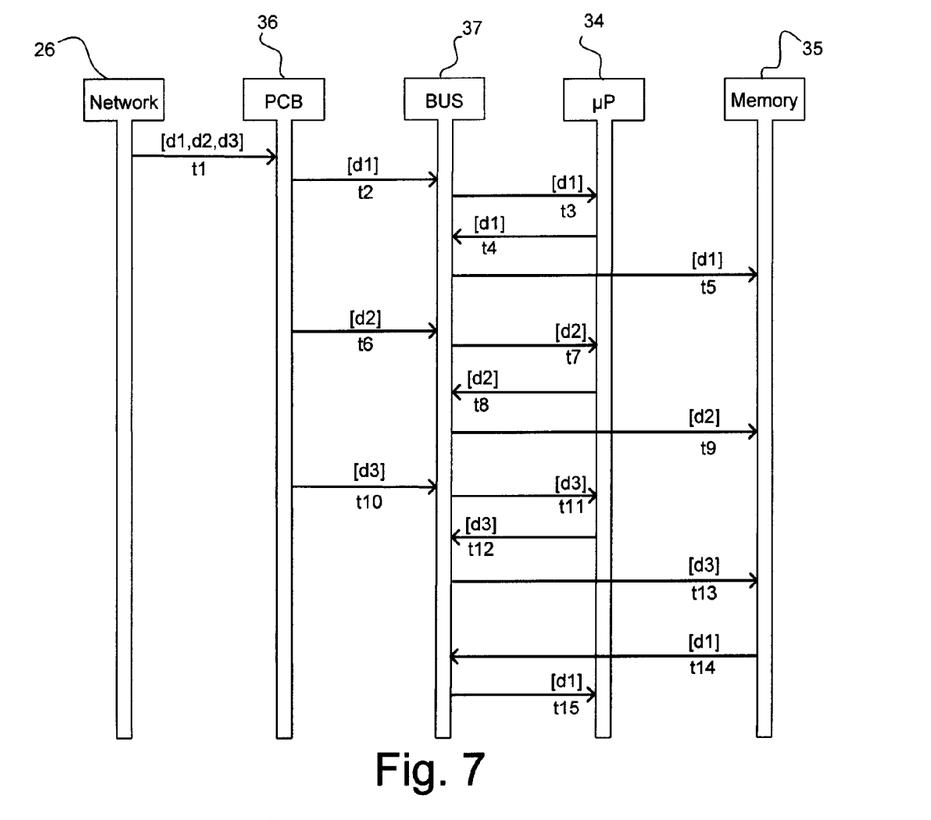
FIG. 7 shows the flow of data within the component of FIG. 6.

FIG. 7 shows the flow of data into and within the component of FIG. 6. Again a data packet comprising three individual data pieces is incoming from the network and the component processor requires the first data piece for immediate processing.

First, the data packet (d1, d2, d3) is received t1 by the physical network connection block 36 from the network switch 26. The component processor then transfers the first piece of data (d1) from the physical network connection block 36 to the BUS 37 t2, and then from the BUS 37 to itself t3. The component processor 34 then determines the destination of the data piece. The data piece is then transferred back to the BUS 37 t4 and on to the memory 35 for storage t5. This process is then repeated for the other two data pieces. The second data piece (d2) is transferred from the physical network block 36 to the BUS 37 t6, from the BUS 37 to the component processor 34 t7, from the component processor 34 to the BUS 37 t8, and finally from the BUS 37 to the memory 35 for storage t9. The same operations occur with the third data piece and comprises a further four data transfers (t10 to t13). When all three data pieces have be transferred to the memory, the first data piece is recalled from the memory 35 to the BUS 37 t14, and then onto the component processor 34 for processing t15.

From a comparison of FIGS. 5 and 7, it is clear that the provision of the network connection processor 27 dramatically reduces the data traffic within the component.

Figure 8:
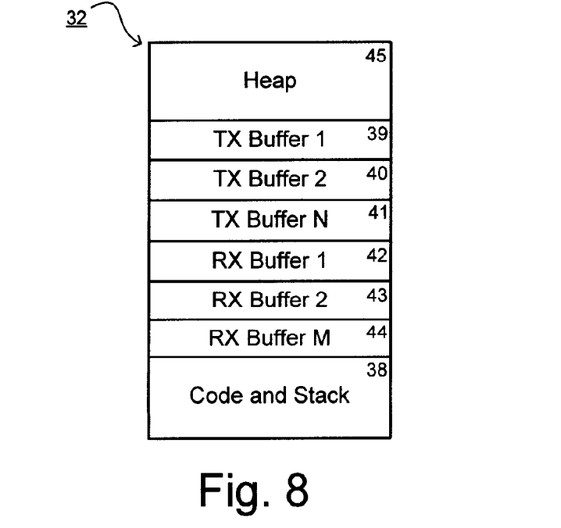
FIG. 8 shows a conceptual memory allocation for the network connection processor memory.

FIG. 8 depicts the conceptual memory allocation for the network connection processor memory 32. The code and stack 38 portion may be used to store instructions and variables for the operating system, the network stack, the middleware, and any low-level control software that the network connection processor requires in order to operate. The memory may further comprise circular buffers which comprise a first transmit buffer 39, a second transmit buffer 40 and a third transmit buffer 41, and also a first receive buffer 42, a second receive buffer 43 and a third receive buffer 44. The heap 45 controls the allocation of the buffers The number of buffers does not need to be high, but it is advantageous to have several so that they can be rotated. That is, when a receive buffer becomes full, it is converted into a transmit buffer and it becomes read-only. After the contents of the transmit buffer have been transferred off the network connection processor, the allocated memory space of the buffer may be freed.

The use of the network connection processor is not limited to the example of FIG. 4. For example, if the service or application is very small, such as a single sensor, but a connection to the network is still desired, the service or application may be mapped to the network connection processor rather than to a separate component processor.

Figure 9:
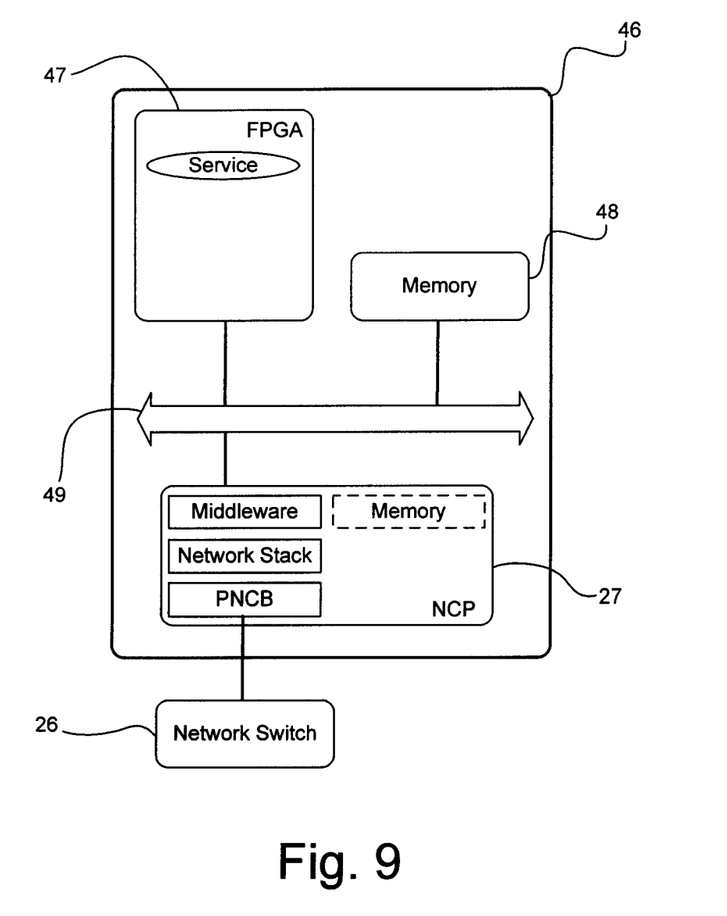
FIG. 9 shows a component of the modular network hardware architecture wherein the service is mapped to a field programmable gate array.

Similarly, hardware-centric IP can also be integrated with a network connection processor. Depending on the complexity of the service, the network connection processor may need to decode the service messages or the hardware may be sufficiently intelligent to do it on its own. Field programmable gate arrays could be used to provide a programmable hardware service. By providing the field programmable gate array with new configuration bitstreams, it could be used as a different service every time. FIG. 9 illustrates a component 46 comprising a field programmable gate array 47, a memory 48, a BUS 49 and a network connection processor 27 (as in FIG. 4).

Figure 10:
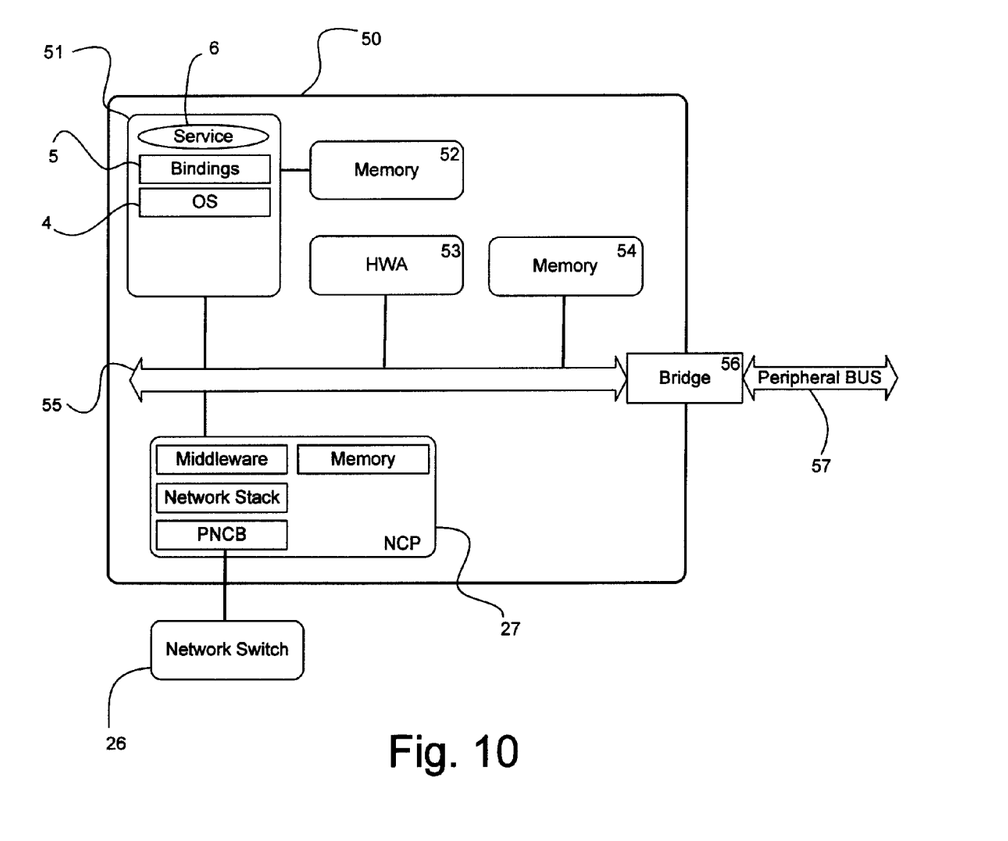
FIG. 10 shows a network connection processor as the network connection point of a complex computing architecture.

FIG. 10 shows a network connection processor as the connection point of a complex computing architecture. A component 50 comprises a network connection processor 27, a component processor 51 with dedicated memory 52, a hardware accelerator 53, component memory 54, a BUS 55 and a bridge 56. The network connection processor 27 is connected to the network switch 26. The bridge 56 is connected to the BUS 55 and the peripheral BUS 57, which may be the interconnect of another component or even an entire network.

Figure 11:
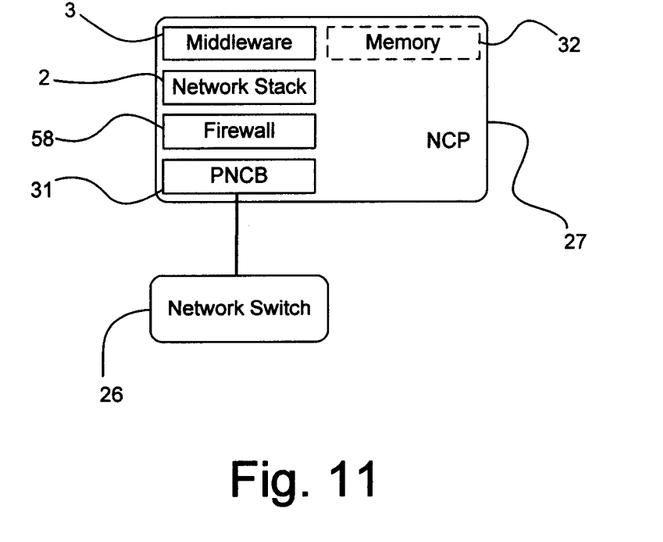
FIG. 11 shows a network connection processor configured to implement a firewall.

In addition to the features described above, the network connection processor may also be configured to implement firewall functionalities. FIG. 11 shows a network connection processor including such a capability. In addition to the features of the above-described embodiments, the network connection processor 27 comprises a firewall 58 interposed between the network stack 2 and the PNCB 31.

The firewall functionality may be implemented by a network layer firewall. A network layer filter may also be known as a packet filter. As such, the firewall may be configured to filter out incoming data from unauthorized sources. The firewall may alternatively or additionally be configured to filter out incoming data that does not comply with predetermined allowed data patterns. This allows data that matches the predetermined allowed patterns and/or data incoming from authorized sources to pass. Other data is discarded. A user of the hardware organisation may define the authorised sources and/or allowed data patterns. Alternatively, the authorised sources and/or allowed data patterns may be pre-stored in the hardware organisation. The firewall may comprise a stateful network layer firewall or a stateless network layer firewall.

The firewall functionalities may alternatively be implemented by a firewall other than of the network layer firewall type.

It should be realised that the foregoing examples should not be construed as limiting. Other variations and modifications will be apparent to persons skilled in the art upon reading the present application. Moreover, the disclosure of the present application should be understood to include any novel features or any novel combination of features either explicitly or implicitly disclosed herein or any generalisation thereof and during the prosecution of the present application or of any application derived therefrom, new claims may be formulated to cover any such features and/or combination of such features.

The invention claimed is:

1. An apparatus comprising:
a plurality of modular components each relating to a different function of the apparatus;
a component of the plurality of components comprising a network connection processor, which comprises a physical network connection block to receive data from and transmit data to a network and a first data processor configured to process data arriving at the network connection processor, wherein the network connection processor writes the processed data into a memory;
the component further comprising a second data processor configured to further process the processed data written to the memory by the network connection processor; and
the component further comprising an internal connection bus for connecting the first data processor to the memory and the memory to the second data processor, wherein the first data processor is further configured to process the data by decoding the data, determining a destination for the data, and transforming the data into a format that is recognized by the second data processor wherein the second data processor receives the processed data from the memory via the internal connection bus and does not perform at least some of the data processing performed by the first data processor so that the second data processor is free to perform other tasks; and
wherein the first data processor is separate from the second data processor such that only the first data processor handles network interconnect traffic.

2. The apparatus according to claim 1, wherein the network connection processor is decouplable from said apparatus.

3. The apparatus according to claim 1, wherein the second data processor is further configured to implement an application or service.

4. The apparatus according to claim 1 further comprising a transport system configured to transport data between the network connection processor and the second data processor.

5. The apparatus according to claim 1 wherein the memory comprises internal memory.

6. The apparatus according to claim 5, wherein the transport system is further configured to transport data between the network connection processor and the memory, and between the second data processor and the memory.

7. The apparatus according to claim 1, wherein the memory comprises external memory, the external memory being exclusive to the apparatus.

8. The apparatus according to claim 1, wherein the network connection processor further comprises the memory.

9. The apparatus according to claim 8 wherein the memory comprises circular buffers.

10. A method comprising:
receiving data from a network;
processing the received data using a first data processor comprising a portion of a network connection processor, the network connection processor being a part of a component of a plurality of modular components each relating to a different function;
transporting by the network connection processor the processed data to a memory;
storing the processed data;
transporting the processed data from the memory to a second data processor via an internal connection bus wherein the internal connection bus connects the first data processor to the memory and the memory to the second data processor, wherein the second data processor and the internal connection bus are parts of the component; and
further processing the processed data using the second data processor;
wherein processing the received data comprises the first data processor decoding the data, determining a destination for the data, and transforming the data into a format that is recognized by the second data processor wherein the second data processor does not perform at least some of the data processing performed by the first data processor so that the second data processor is free to perform other tasks; and
wherein the first data processor is separate from the second data processor such that only the first data processor handles network interconnect traffic.

11. A method according to claim 10, wherein further processing the processed data comprises implementing an application or service.

12. An apparatus according to claim 11, wherein the first data processor is configured to implement a firewall.

13. A method according to claim 10, wherein processing the received data comprises implementing a firewall.

14. A system comprising:
a network connection processor, comprising:
a plurality of modular components each relating to a different function of the apparatus;
a component of the plurality of components comprising a physical network connection block to receive data from and transmit data to a network;
the component further comprising a first processor configured to process data arriving at the network connection processor by decoding the data, determining a destination for the data, and transforming the data into a format that is recognized by a second processor; wherein the network connection processor writes the processed data into a memory and the component further comprises the second processor and an internal connection for connecting the first processor to the memory and the memory to the second processor;
wherein the second processor is configured to further process the processed data written to the memory by the network connection processor so that the second processor does not perform at least some of the data processing performed by the first processor so that the second processor is free to perform other tasks; and
wherein the first processor is separate from the second processor such that only the first processor handles network interconnect traffic.

15. The system according to claim 14, wherein the network connection processor is decouplable from the apparatus.

16. The system according claim 14, wherein the second processor is configured to implement an application or service.

17. The system according to claim 14 further comprising a transport system configured to transport data between the network connection processor and the second processor.

18. The system according to claim 14, wherein the memory comprises an internal memory.

19. The system according to claim 18, wherein the transport system is further configured to transport data between the network connection processor and the memory, and between the second processor and the memory.

20. The system according to claim 14, wherein the memory comprises an external memory, the external memory being exclusive to the apparatus.

\* \* \* \* \*